United States Patent
Lankes

(10) Patent No.: US 7,627,105 B2
(45) Date of Patent: Dec. 1, 2009

(54) METHOD FOR PROTECTING AGAINST UNDESIRED TELEPHONE ADVERTISING IN COMMUNICATION NETWORKS

(75) Inventor: Holger Lankes, Puchheim (DE)

(73) Assignee: Siemens Aktiengesellschaft, Munich (DE)

( * ) Notice: Subject to any disclaimer, the term of this patent is extended or adjusted under 35 U.S.C. 154(b) by 201 days.

(21) Appl. No.: 11/886,831
(22) PCT Filed: Feb. 16, 2006
(86) PCT No.: PCT/EP2006/060011
§ 371 (c)(1), (2), (4) Date: Sep. 21, 2007
(87) PCT Pub. No.: WO2006/103142
PCT Pub. Date: Oct. 5, 2006

(65) Prior Publication Data
US 2009/0052648 A1    Feb. 26, 2009

(30) Foreign Application Priority Data
Mar. 30, 2005  (DE) ................. 10 2005 014 524

(51) Int. Cl.
H04M 3/436 (2006.01)
H04M 1/57 (2006.01)
(52) U.S. Cl. ............. 379/210.02; 379/198; 379/207.15; 379/210.03
(58) Field of Classification Search .............. 709/207, 709/229
See application file for complete search history.

(56) References Cited

U.S. PATENT DOCUMENTS

| 5,371,787 A | 12/1994 | Hamilton |
| 7,020,259 B2 * | 3/2006 | Hussain et al. ......... 379/211.02 |
| 7,099,444 B1 * | 8/2006 | Russell .................. 379/142.02 |
| 7,295,660 B1 * | 11/2007 | Higginbotham et al. ..... 379/196 |
| 7,307,997 B2 * | 12/2007 | Vinokurov et al. .......... 370/401 |
| 2003/0023736 A1 | 1/2003 | Abkemeier |
| 2004/0213396 A1 | 10/2004 | MacNamara et al. |
| 2005/0055415 A1 | 3/2005 | Alsarraf et al. |
| 2006/0239429 A1 * | 10/2006 | Koch et al. ............. 379/201.01 |
| 2007/0201650 A1 * | 8/2007 | Mastro .................. 379/142.01 |
| 2007/0283006 A1 * | 12/2007 | Hong ........................ 709/224 |

* cited by examiner

Primary Examiner—Harry S Hong

(57) ABSTRACT

A first list and a second list of identifications are established, with which a telemarketing advertisement or no undesirable telemarketing advertisement is expected. The identification of the caller an incoming call is compared to the identifications in the list. If the identification of the call is not found in the lists, the call is routed to a call processing which enables the reception of a telemarketing advertisement to ascertained and, based on the result of that determination, the lists are correspondingly updated. The calls for which the identification of the caller is recorded in the second list are routed to the called party and the calls for which the identification of the caller is recorded in the first list are rejected. Such protection against telemarketing is particularly efficient in the context of an industrial operation with numerous human resources and for lines on which several calls can be simultaneously carried.

20 Claims, 1 Drawing Sheet

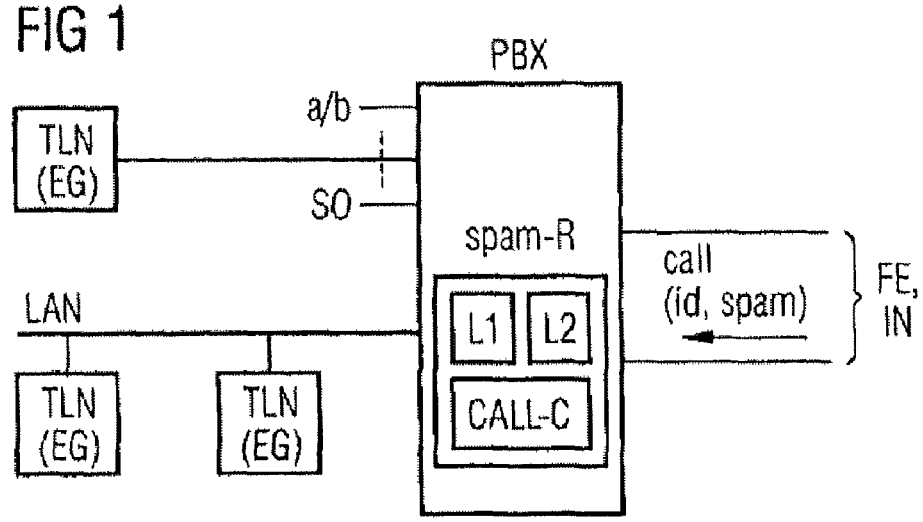
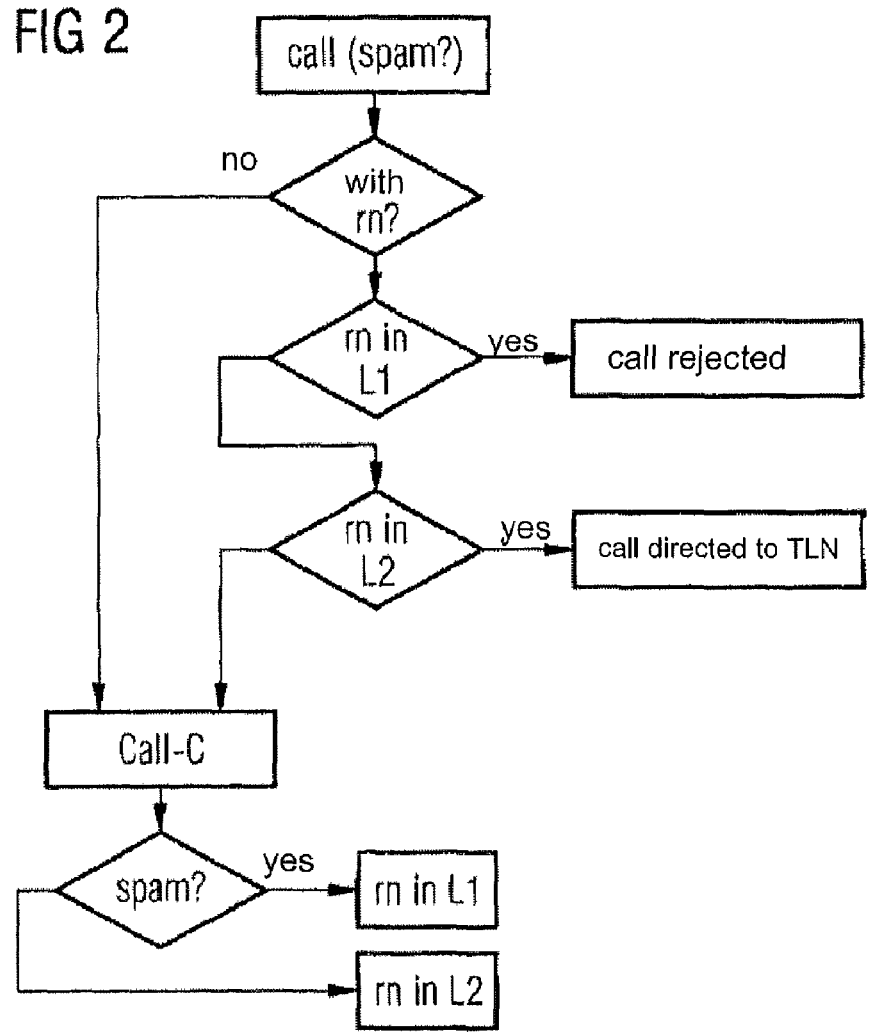

METHOD FOR PROTECTING AGAINST UNDESIRED TELEPHONE ADVERTISING IN COMMUNICATION NETWORKS

CROSS REFERENCE TO RELATED APPLICATIONS

This application is the US National Stage of International Application No. PCT/EP2006/060011, filed Feb. 16, 2006 and claims the benefit thereof. The International Application claims the benefits of German application No. 102005014524.8 DE filed Mar. 30, 2005, both of the applications are incorporated by reference herein in their entirety.

FIELD OF INVENTION

The present invention relates to a method for protecting against undesired telephone advertising in communication networks.

BACKGROUND OF INVENTION

In the case both of conventional telephone networks employing time-division multiplexing and of internet telephony, users are increasingly confronted with undesired telephone advertising—referred to in technical circles also as spam. Said undesired telephone advertising is executed by automatic callers with the aid of which call numbers are dialed randomly or selectively, with its being attempted by means of stored, pre-established voice information to sell the called user goods or services or to induce the user to call back to an expensive premium service having in Germany, for example, the prefix 0190.

SUMMARY OF INVENTION

One possible way of partially protecting oneself against undesired telephone advertising is to use what is known in technical circles as the "Robinson list". Users can have themselves enrolled in the Robinson list administered by the "Deutscher Direkt-Marketing-Verband", meaning the German Direct Marketing Association, to prevent the advertising companies belonging to that association from sending the enrolled users any telephone advertising or from faxing or e-mailing them any advertising material. It must, though, be noted that the use of such lists by said advertising companies is voluntary and that not all advertising companies are members of that association. Moreover, said Robinson list is effective in Germany only, meaning that telephone advertising communicated from abroad cannot be prevented thereby.

Another possible way of preventing undesired advertising is to loop an automatic answering machine into each incoming call. The disadvantage of said method is an unnecessary use of resources (trunk lines, memory) on the called party's side. Furthermore, the caller's objective of a callback may still be achieved via said method with a time delay.

US 2003/0023736 A1 discloses a method and a system for filtering messages wherein it is determined on the basis of stored authorization criteria and message criteria of received messages whether the received message is authorized or not. An unauthorized sender is then displayed and the sender attempts to meet the authorization criteria. The authorization filter uses a blacklist and a whitelist in which the unauthorized and authorized senders are and will be recorded.

U.S. Pat. No. 5,371,787 describes an answer detector device by which a call to a subscriber is controlled and in which it is analyzed whether the call was answered by an answering machine or by a person.

The object of the invention is to provide better protection against calls containing telephone advertising or spam. Said object is achieved by means of the independent claims.

What can be seen as a major aspect of one inventive method is that a first and second list of identifications is provided for which undesired telephone advertising respectively is or is not to be expected and that the caller's identification in an incoming call is compared with the identifications contained in said lists. If a call arrives in the case of which the caller's identification is not contained in the lists, the call will be directed to a call handler with the aid of which an examination will be conducted to determine whether telephone advertising is being received. The lists will be updated accordingly depending on the examination result. According to a major aspect of a further inventive method, after the lists have been updated, calls in the case of which the caller's identification has been entered in the second list will be directed to the called user and calls in the case of which the caller's identification has been entered in the first list will be rejected. A call without identification will be directed to the call handler and the call will be directed to the called party or rejected depending on the examination result.

What can be seen as a major advantage of the invention is that the saving or reduction in the time taken to detect and listen to telephone advertising will, particularly in commercial enterprises, result in more efficient use being able to be made of important personnel resources. Through the rejection of calls in particular during the signaling phase, more efficient use can also be made of lines, particularly lines over which a plurality of calls are conducted simultaneously. The lines to the switches and hence also the operating costs can be reduced thereby.

According to an advantageous development of the invention the call is examined by the call handler to determine whether it is being conducted by an automatic caller with automatically announced telephone advertising. That can advantageously be done by determining in the call handler on the basis of the ratio of pauses in speech to speech duration in the received voice information whether the call in progress is being conducted by an automatic caller with automatically announced telephone advertising. A speech interaction with the caller is alternatively performed by the call handler, with a pre-defined spoken response to a spoken inquiry being expected and the call being determined to be one with telephone advertising if the caller fails to make an appropriate spoken response. It can thanks to said advantageous developments be determined at little economic expense whether an automatic caller is calling that wishes to convey telephone advertising or whether a user, which is to say a person, is calling.

The invention is provided particularly advantageously in a call switch, private branch exchange, or softswitch equipped with call handling, because the lists and call handling will then respectively be maintained and performed centrally for a plurality of users and a particularly economic implementation of the invention achieved thereby.

Further advantageous developments of the invention may be derived from the dependent claims.

BRIEF DESCRIPTION OF THE DRAWINGS

The invention is explained below with reference to two drawings, in which

FIG. 1 shows a topology within which the invention can be realized, and

FIG. 2 is a flowchart showing how an incoming call is handled.

DETAILED DESCRIPTION OF INVENTION

FIG. 1 shows a network topology within which the inventive method can be employed. Connected to a switch device, in the exemplary embodiment a private branch exchange PBX, referred to below as a PBX, are terminals EG of users TLN, with said terminals EG being connected via an analog a/b interface a/b or a digital ISDN interface S0, including the respective signaling procedures, to the PBX. The PBX is furthermore linked via an interface to a local network LAN—referred to below as a LAN—, to which further terminals EG can be connected, with an internet protocol being provided in the LAN. Connected as terminals EG to the a/b interface and S0 interface a/b, S0 are telephones, in the exemplary embodiment special telephones for PBXs, and to the LAN, special internet telephones or personal computers having a telephone function.

Provided in the PBX is a spam routine Spam-R or a routine for protecting against telephone advertising. Two lists L1, L2 are implemented in said routine, with identifications id in the case of which the assigned users are implemented by means of automatic callers—not shown—and said automatic callers attempt to send any users telephone advertising having been or being entered in the first list L1. A second list is implemented in the spam routine Spam-R, with identifications rn in the case of which the assigned users are not automatic callers with undesired advertising having been or being entered in said list L2. The spam routine Spam-R furthermore contains a call handler CALL-C with the aid of which calls are handled whose caller identifications id have been entered neither in the first nor in the second list L1, L2. Said identifications id can be call numbers of the telephone networks or they can be internet addresses of internet users having a telephone function.

The PBX is additionally equipped with interfaces for connecting to a public network, in particular an operator's telephone network FE, and/or for connecting to the internet IN—indicated respectively in FIG. 1 by the references FE, IN. Let it be assumed for the exemplary embodiment that calls (call) with telephone advertising spam and without telephone advertising arrive from the telephone network FE or internet IN—indicated in FIG. 1 by the reference call (spam).

Based on the above explanations, a flow of the invention is illustrated using the flowchart in FIG. 2. The identification id of the caller or, as the case may be, the calling user TLN is first sought in an incoming call (call). The caller's identification id is usually transmitted within the scope of call signaling—for example CLIP, or internet address, or Inter-Exchange Signaling System No. 7. Let it be assumed for the explanation of the invention in FIG. 2 that the identifications id have been indicated as call numbers, with these being referenced rn in FIG. 2. When the caller's call number rn has been determined, it will be compared with the call numbers rn in the first list L1. The call (call) will be rejected if contained in the first list because it is a call (call) with telephone advertising.

If the caller's call number rn is not contained in the first list L1, the second list L2 will be checked for the presence of the call number rn. If the call number rn is found in the second list L2, the incoming call (call) will be directed to the addressed user TLN of the PBX or, as the case may be, switched through by the PBX or LAN.

If the caller's call number rn does not appear in the second list L2 either, or if no call number rn at all has been communicated (CLIR), then the call (call) will be directed with the aid of the PBX to the call handler CALL-C. The incoming call (call) will be examined therein to determine whether it is being conducted by an automatic caller with automatically announced telephone advertising spam or whether it is an ordinary telephone call. The calls can be examined using a plurality of alternative methods.

According to a first method, the ratio of pauses in speech to speech duration in the received voice information is ascertained. It can be determined relatively reliably based on said ratio whether the received voice information is voice information from a user TLN or from an automatic caller with telephone advertising spam. That is possible because the pauses in speech are much shorter in the case of calling devices or, as the case may be, automatic callers and the speech durations are longer than in the case of calls from users or, as the case may be, persons.

With a further method for determining calls from automatic callers, speech samples of the incoming voice information are recorded and compared with already recorded speech samples from automatic callers with telephone advertising spam. If the samples largely tally, it may be assumed it is a call with telephone advertising spam.

According to a further method for determining calls from automatic callers, the call handler CALL-C attempts to interact with the incoming call (call), meaning that an input request is conveyed in response to which certain inputs by the caller are expected. If the caller does not respond, it may be assumed it is a call with telephone advertising spam.

Depending on the examination results, the call number rn of the incoming call (call) will be entered in either the first or the second list L1, L2—no entry will be made in the case of calls (call) not having a communicated call number rn—and the incoming call (call) will be either rejected or forwarded to the addressed user TLN or, as the case may be, to the addressed terminal EG or, as the case may be, switched through by the PBX or LAN.

According to a variant not shown in FIG. 2, a call (call) with telephone advertising spam can be directed to the addressed user TLN or, as the case may be, to the addressed terminal EG despite the examination in the call handler CALL-C. It is in that case provided for the call (call) to be directed back to the call handler CALL-C in order with the aid thereof to record speech samples of the telephone advertising spam. These can then be used within the scope of an examination of further calls (call) for a comparison with the speech samples those contain. Alternatively or as an additional measure it is possible, after a user TLN has determined a call (call) with telephone advertising spam, for the call number rn or, as the case may be, the identification id of the call (call) to be entered in the first list L1 by means of special inputs on the terminal EG of the user TLN, as a result of which if a further such call (call) arrives for said user TLN it will immediately be rejected.

The invention is not restricted to this exemplary embodiment and can be used in any communication network offering discriminating identification or, as the case may be, addressing, with its therein being possible to employ different first and second lists for the different networks. Methods coordinated therewith for determining or, as the case may be, recognizing or ascertaining calls with telephone advertising are also possible, with its having to be taken into account that for transmitting non-voice information such as, for example, e-mails, automatic callers are normally used and that it is more difficult to detect advertising spam.

The invention claimed is:

1. A method for protecting against undesired telephone advertising comprising:

providing a first list for storing an identification of a caller expected of telephone advertising, the first list accessible to a switch device;

providing a second list for storing an identification of a caller not expected of telephone advertising, the second list accessible to the switch device;

the switch device comparing an identification of a caller of an incoming call with the identification stored in the first list;

the switch device comparing the incoming call identification with the identification stored in the second list;

the switch device directing the incoming call to a terminal of a called party in response to the incoming call identification matching the stored identification in the second list;

the switch device directing the incoming call to a call handler mechanism connected to the switch device in response to the incoming call identification not matching the stored identification in the first list and not matching the stored identification in the second list;

the switch device directing the incoming call to the call handler mechanism in response to the incoming call not having an identification;

the call handler mechanism examining the incoming call to determine whether telephone advertising is being received in response to the call being directed to the call handler mechanism;

in response to the examination by the call handler mechanism determining that telephone advertising is being received:

updating the first list to include the incoming call identification in response to the presence of the incoming call identification, and the switch device rejecting the incoming call; and in response to the examination by the call handler mechanism determining that advertising is not being received:

updating the second list to include the incoming call identification in response to the presence of the incoming call identification and the switch device directing the incoming call to the terminal of the called party.

2. The method as claimed in claim 1, wherein the incoming call identification is represented via a call number or an internet address.

3. The method as claimed in claim 1, further comprising examining the call by the call handler mechanism to determine if the call is conducted by an automatic caller configured to announce telephone advertising in response to the call being directed to the call handler mechanism.

4. The method as claimed in claim 3, wherein the call handler mechanism ascertains using a ratio of pauses in speech to speech duration in a received voice information whether the incoming call is being conducted by the automatic caller.

5. The method as claimed in claim 3, wherein a speech interaction with the caller is performed by the call handler mechanism with a pre-defined spoken response to a spoken inquiry being expected and the incoming call being determined to be one with telephone advertising if the caller fails to make an appropriate spoken response.

6. The method as claimed in claim 3, further comprising:

storing speech samples of automatic callers with automatically announced telephone advertising via the call handler mechanism;

the call handler mechanism comparing speech samples of the incoming call with the stored speech samples; and the call handler mechanism determining if the incoming call is telephone advertising depending on the result of the comparison.

7. The method as claimed in claim 1, wherein the called party indicates via an input that the incoming call arriving at the called party is advertising and the incoming caller identification is added to the first list in response to the input by the called party.

8. The method as claimed in claim 1, wherein the lists are compiled and periodically updated and the switch device is a call switch equipped with the call handler mechanism, a private branch exchange equipped with the call handler mechanism, or a softswitch equipped with the call handler mechanism.

9. A method for protecting against undesired advertising in a network having a switch device connected to a plurality of terminals and a call handler device, the method comprising:

providing a first list for storing an identification of a caller expected of telephone advertising, the first list provided such that the first list is accessible to the switch device;

providing a second list for storing an identification of a caller not expected of telephone advertising, the second list provided such that the second list is accessible to the switch device;

the switch device comparing an identification of a caller in an incoming call with the identification stored in the first list;

the switch device comparing the incoming call identification with the identification stored in the second list;

the switch device directing the incoming call to the call handler device in response to the incoming call identification not matching the stored identification in the first list and not matching the stored identification in the second list;

the call handler device examining the incoming call to determine whether telephone advertising is being received;

updating the first list to include the incoming call identification in response to the examination by the call handler device determining that telephone advertising is being received;

updating the second list to include the incoming call identification in response to the examination by the call handler device determining that telephone advertising is not being received;

the switch device directing the incoming call to a called party when the incoming call identification is in the second list; and rejecting the incoming call when the incoming call identification is in the first list; and wherein the incoming call identification identifies at least one of a call number and an internet address.

10. The method as claimed in claim 9, further comprising directing the incoming call to the call handler device in response to the incoming call not having an identification.

11. The method as claimed in claim 9, further comprising examining the call by the call handler device to determine if the call is conducted by an automatic caller configured to automatically announce telephone advertising in response to the call being directed to the call handler device.

12. The method as claimed in claim 11, wherein the call handler device is configured to utilize an ascertained ratio of pauses in speech to speech duration in a received voice information to determine whether the incoming call is being conducted by the automatic caller.

13. The method as claimed in claim 11, wherein a speech interaction with the caller is performed by the call handler device with a pre-defined spoken response to a spoken inquiry being expected and the incoming call being determined to be one with telephone advertising if the caller fails to make an appropriate spoken response.

14. The method as claimed in claim 11, further comprising:
   storing speech samples of automatic callers with automatically announced telephone advertising via the call handler device
   the call handler device comparing speech samples of the incoming call with the stored speech samples; and
   the call handler device determining if the incoming call is telephone advertising depending on the result of the comparison.

15. The method as claimed in claim 9, wherein the called party indicates via an input that the incoming call arriving at the called party is advertising and the incoming caller identification is added to the first list in response to the input by the called party.

16. The method as claimed in claim 9, wherein the lists are compiled and periodically updated and the switch device is a call switch equipped with the call handler device, a private branch exchange equipped with the call handler device, or a softswitch equipped with the call handler device.

17. The method of claim 1 wherein the switch device is a PBX, softswitch or a call switch.

18. The method of claim 1 wherein the call handler mechanism is integrally connected to the switch device.

19. The method of claim 1, wherein the switch device is a component of a communications network and the switch device is connected to a plurality of terminals.

20. A method for protecting against undesired telephone advertising in a communications network comprised of a switch device connected to a call handler apparatus and at least one terminal, the method comprising:

providing a first list for storing an identification of a caller expected of telephone advertising, the first list accessible to the switch device;

providing a second list for storing an identification of a caller not expected of telephone advertising, the second list accessible to the switch device;

the switch device comparing an identification of a caller of an incoming call with the identification stored in the first list;

the switch device comparing the incoming call identification with the identification stored in the second list;

the switch device directing the incoming call to a terminal of a called party in response to the incoming call identification matching the stored identification in the second list;

the switch device directing the incoming call to the call handler apparatus in response to the incoming call identification not matching the stored identification in the first list and not matching the stored identification in the second list;

the switch device directing the incoming call to the call handler apparatus in response to the incoming call not having an identification;

the call handler apparatus examining the incoming call to determine whether telephone advertising is being received in response to the call being directed to the call handler apparatus; and in response to the examination by the call handler apparatus determining that telephone advertising is being received: updating the first list to include the incoming call identification in response to the presence of the incoming call identification, and the switch device rejecting the incoming call.

* * * * *